July 3, 1956 E. S. HEBELER 2,753,392
CABLE CONNECTIONS
Filed Dec. 5, 1952 2 Sheets-Sheet 1

INVENTOR.
Edward S. Hebeler
BY
Parker, Crichnow & Farmer
Attorneys.

July 3, 1956  E. S. HEBELER  2,753,392
CABLE CONNECTIONS
Filed Dec. 5, 1952   2 Sheets-Sheet 2

INVENTOR.
Edward S. Hebeler
BY
Parker, Prochnow & Turner
Attorneys.

United States Patent Office 2,753,392
Patented July 3, 1956

2,753,392

CABLE CONNECTIONS

Edward S. Hebeler, Williamsville, N. Y.

Application December 5, 1952, Serial No. 324,206

10 Claims. (Cl. 174—84)

This invention relates to improvements for connecting electrical conducting cables without the use of solder either for the purpose of connecting two cables to each other or for connecting a cable to another conductor.

Connections of this type must be such as to form an intimate contact between the cable and the part connected therewith over extended surfaces so that the cable connection will offer the minimum resistance to the flow of electricity through the same to avoid overheating of the connection and loss of power in the same, and furthermore, for many purposes, it is very essential that the connection be so formed that as the cable at this connection is moved, twisted, or bent and the individual wires of the cable readjust themselves, there will be no increase in the resistance of the connection.

One of the objects of this invention is to provide an improved cable connection which complies with the above mentioned requirements, and in which the parts are so constructed that the connection can readily be made without the use of tools. Another object is to provide a connection of this type of compact construction, thus avoiding a cumbersome enlargement at the connection. A further object of this invention is to provide a connection of this type including an outer rigid tube extending about two gripping members of the connection, and resilient means within the tube and reacting against the same for continuously urging the gripping members into engagement with the cable, for keeping the strands of cable in firm contact with each other.

Other objects and advantages will be apparent from the following description of one embodiment of the invention and the novel features will be particularly pointed out hereinafter in connection with the appended claims.

Figure 1:
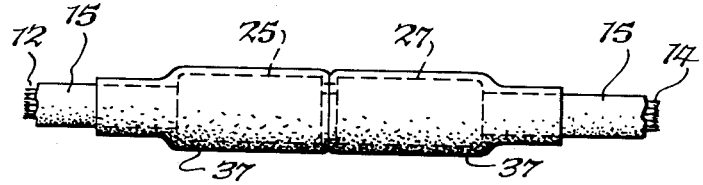
Fig. 1 is an exterior view of a cable connection embodying this invention.
Figure 2:
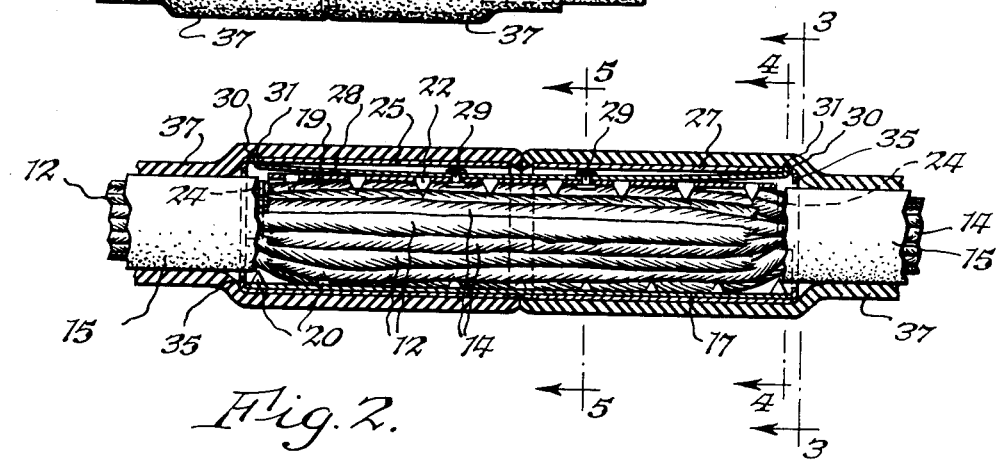
Fig. 2 is a longitudinal central sectional elevation thereof, on an enlarged scale.
Figure 3:
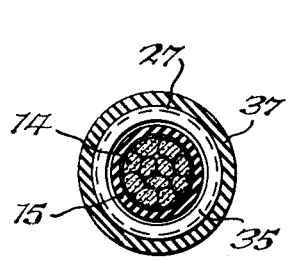
Figure 4:
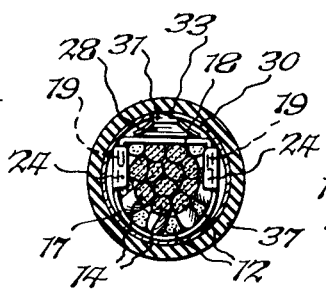
Figure 5:
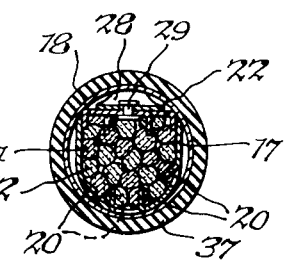

Figs. 3, 4 and 5 are respectively transverse sections thereof, on lines 3—3, 4—4 and 5—5 of Fig. 2.

Figure 6:
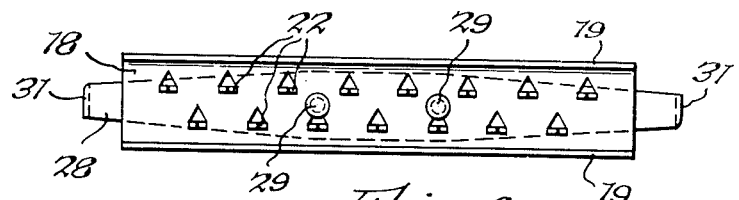

Fig. 6 is a bottom plan view of one of the gripping members of the connection.

Figure 7:
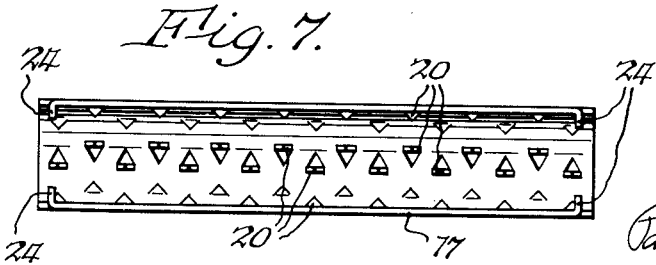

Fig. 7 is a top plan view of the other gripping member.

Figure 8:
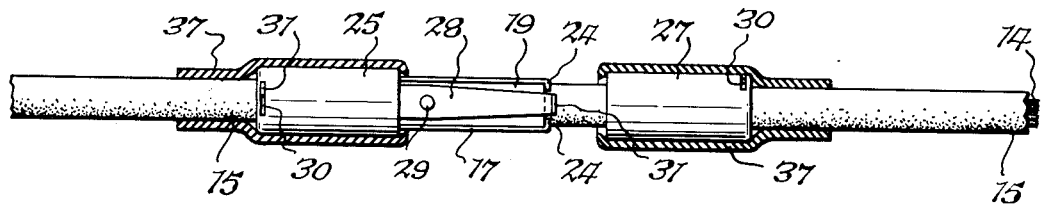

Fig. 8 is a longitudinal view of my improved cable connection showing some of the parts separated from other parts.

Figure 9:
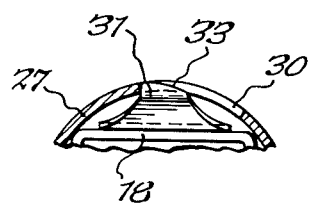

Fig. 9 is a fragmentary transverse sectional elevation, on an enlarged scale, on line 4—4, Fig. 2, with the outer insulating tube omitted.

Figure 10:
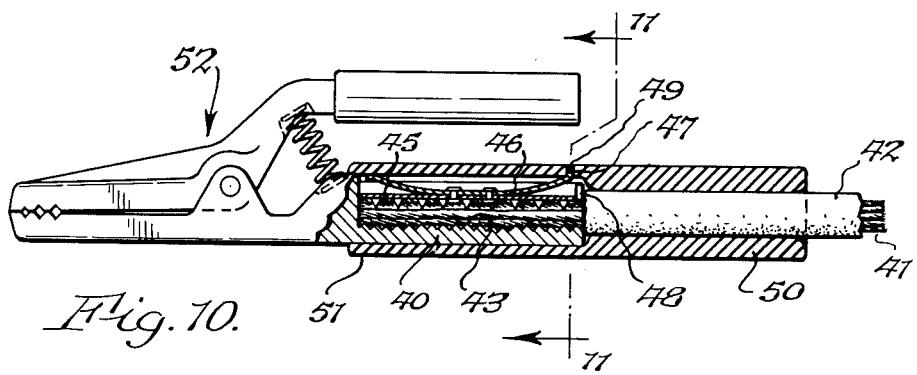

Fig. 10 is an elevation, partly in section, showing a cable connection of modified construction applied to an electrode holder.

Figure 11:
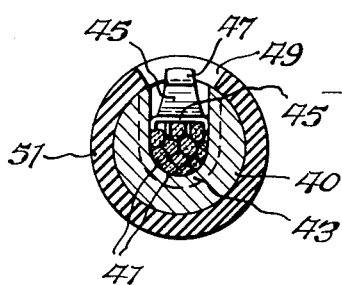

Fig. 11 is a transverse section thereof, on an enlarged scale on line 11—11, Fig. 10.

The improvements embodying my invention may be used for connecting the ends of two cables, such connection being shown in Figs. 1 to 8 of the drawings, and for applying the end of a single cable to a rigid electricity conducting member, such for example, as electrode holder for use in connection with welding, as shown in Figs. 9 and 10.

In Figs. 1 to 8, I have shown my improved cable connection applied to connecting the ends of two cables 12 and 14. These cables may be of any usual or suitable construction covered by insulating sheaths 15. The cables are made of a large number of wires of small diameter which may be twisted together into a plurality of strands, as shown in Figs. 2 to 5, and in order to form a good connection of low resistance, these strands of the two cables are laid into overlapping relation to each other at the joint or connection, as has heretofore commonly been done in cable connections, preferably so that the strands of one cable are laid between the strands of the other cable.

My improved connection includes two clamping members constructed to grip a cable or the overlapping portions of the two cables. These gripping or clamping members, in the particular construction shown, comprise a substantially trough-shaped member 17 into which the overlapping ends of the cable are placed, and a cover member 18 which is preferably of shallow channel shape having flanges 19 which fit in between the two legs of the trough-shaped member 17. Those two gripping members are forced toward each other in such a manner as to press the overlapping portions of the cables 12 and 14 into contact with each other.

Means are preferably provided on the trough-shaped gripping member to prevent longitudinal sliding of this member relatively to the cable. In the construction shown for this purpose, the trough-shaped member 17 is provided with a number of inwardly extending, pointed projections 20 which may be formed by partly punching or cutting out portions of the trough member, for example, to form the two converging sides of the projections, and leaving the third side of the projection connected with the trough-shaped member. The pointed portions of the projections are bent toward the interior of the trough into position to penetrate into the strands or between the wires of the cable in such manner as to hold the trough-shaped member and cable securely against lengthwise movement relatively to each other. If desired, the cover member 18 may be provided with similar pointed projection 22 extending toward the interior of the trough-shaped member to embed themselves between the wires or strands of the cable. If, however, the strands of the two cables are intermeshed or interwoven with each other, these projections on the trough and cover member may be omitted.

Means are also provided to prevent the cover member from shifting lengthwise relatively to the trough member, and for this purpose, in the construction shown, small ears or lips 24 are bent inwardly from the upper portions of the ends of the side walls of the trough, with which the ends of the flanges 19 of the cover member may engage to prevent such shifting.

It will be obvious from the foregoing that when the two gripping members are pressed toward each other, they will press the wires of the two ends of the cables into firm contact with each other and if the strands of the two cables are intermeshed or interwoven with each other, such pressure will be sufficient to prevent separation of the cables from each other. If the clamping members are provided with projections 20 and 22, then movement of the gripping members relatively to the cables is prevented, and the projections will serve to further oppose movement of the ends of the cables relatively to each other. Since the gripping members are made of steel or other electricity conducting metal, these members may also serve to conduct some current from one cable to the other.

Any suitable means may be provided for holding the two gripping members in their gripping positions. Yielding means are also provided for compressing the overlapping ends of the cable into engagement with each other in such a manner that if the wires of the cables shift relatively to each other, so that possibly the wires will occupy a smaller space between the gripping members, the cover member will be pressed farther into the trough member so that the wires will always be firmly pressed into contact with each other. In the construction shown for this purpose, I provide one or more tubes which are formed to extend about the gripping members. Two such tubes 25 and 27 are shown in the construction illustrated in Figs. 1 to 8, and suitable resilient means are provided which react with the interior surfaces of the tubes and with one or both of the gripping members to press these members into engagement with the wires of the cables. In the construction shown by way of example for this purpose, a leaf spring 28 is provided which is secured intermediate of its ends to the outer surface of the cover member, for example, by means of a pair of rivets 29 extending through the spring and the cover member. As a result of this construction, the two ends of the spring bear against the tubes 25 and 27 and the middle portion of the spring bears against the cover member so as to urge the same into the trough member.

In order to lock the tubes against movement relatively to the clamping members, I have provided each tube adjacent to an end thereof with a short recess or circumferentially extending slot 30, see particularly Fig. 4, and the spring 28 is also provided at the outer ends thereof with outwardly bent flanges or shouldered parts 31 which are shaped to enter the slots 30. In order to make is possible to disengage the projection 31 from the slots 30 when it is desired to remove the tubes from the connection, I provide the outer ends of the flanges or shouldered parts 31 of the springs with inclined faces 33, as clearly shown in Fig. 9, so that by turning the tube, the flange of the spring interlocking therewith may be depressed or cammed inwardly so as to move out of the slot 30. Consequently, if the ends of the spring are interlocked with the tubes, and if it is desired to remove one or both tubes, it is merely necessary to turn the tube in such direction that the edge of the slot therein engages the cam face 33 of the spring. When the end of the spring is out of the slot, the tube may be moved lengthwise out of operative relation to the clamping members. To facilitate the insertion of a spring end into a tube and also to limit the extent to which the gripping members may be inserted into a tube, the ends of the tubes are provided with integrally inturned flanges 35 which engage the ends of the trough-shaped member 18. These flanges are also so located that when a tube is moved lengthwise into its operative position relatively to the gripping members and is stopped by means of the flange 35, the slot 30 will be in position to engage with an end of the spring. This facilitates the locking of the tubes on the gripping members. Any other means for releasably locking the tubes to the gripping members may be employed.

The cable connection may be covered by any suitable or desired insulating means, and in the construction illustrated by way of example in Figs. 1 to 8, I provide a pair of sleeves 37 of rubber or other resilient insulating material which is sufficiently stretchable so that the sleeves may be stretched over the tubes 25 and 27. These sleeves are preferably cemented or glued to the tubes 25 and 27.

In the use of this cable connection, it will be obvious that the ends of two cables to be connected are first stripped of their insulating covers 15 to a certain distance. A sleeve and a tube is then positioned on each cable, as shown on the right-hand side of Fig. 8, and the wires and strands of the cable are then placed into contact with each other, preferably by intermeshing strands of one cable with those of another. The intermeshed portions of the wires of the cable are then placed into a trough member 17 and a cover member 19 is positioned over the open end of the trough. The tubes 25 and 27 are then moved endwise over the gripping members after the ends of the spring 28 have been depressed so that they will enter into the tubes. These tubes are then moved lengthwise of the gripping members until the flanged ends 31 of the springs enter into the slots 30 of the tubes. This will press the wires of the cable ends into good electrical conducting contacts with each other.

In Figs. 10 and 11 my improved cable connection is shown for connecting a cable with an electrode holder 52 or other fitting of electrical conducting material. In this construction, the holder itself is provided with a trough-shaped part 40 formed to receive an end of a cable 41 after the insulating covering 42 therefor has been removed therefrom. The trough-shaped part 40 may be provided with toothed parts or ridges 43 as clearly shown in Fig. 10 to hold the wire of the cable against endwise movement. 45 represents the other gripping member which constitutes a cover member for the trough-shaped part 40 and which may have inwardly extending prongs or projections which embed themselves in the strands of the cable or between the wires thereof. A spring 46 is secured to the cover member in the same manner as the spring 28 is secured to the cover member shown in Figs. 1 to 9, except that preferably only one end of the spring need be provided with an outwardly extending locking projection 47. The trough-shaped part 40 is also provided with inwardly extending projections 48 forming shoulders which confine the cover member 45 against lengthwise movement relatively to the trough.

A metal tube, such as the tubes 25 and 27 may be provided to extend about the two gripping members, but since these electrode holders must be provided with insulating handles, I prefer to provide the fitting with a handle 50 which may be made of any suitable rigid insulating material such as hard fiber and which has a tubular portion which extends about a part of the cable 42 and an extension 51 which extends about the gripping members 40 and 45. The ends of the spring 46 bear against the interior of the tubular extension 51 of the hand grip and the hand grip is also provided with a hole or slot 49 into which the bent or shouldered end 47 of the spring 46 may enter for holding the hand grip against lengthwise movement relatively to the electrode holder. The shouldered end 47 of the spring is not provided with an inclined or cam face, since in this construction, this end of the spring can easily be disengaged from the tubular extension 51 by merely pushing the same inwardly by means of a welding rod or other device and simultaneously pulling the handle away from the electrode holder. It will, consequently, be evident that in Figs. 10 and 11, the insulating handle 50 serves both as the confining tube for the gripping members to take the place of one of the tubes 25 or 27 of Figs. 1 to 8, and as an insulating sleeve to take the place of the insulating sleeves 37 shown in Figs. 1 to 8.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. A cable connection including a trough-shaped member in which the ends of two cables may lie in overlapping relation lengthwise thereof, a cover member lying lengthwise of the open side of said trough-shaped member and being of a width to extend into said trough to engage said overlapping cable ends, a tube extending about said members, spring means interposed between said cover member and said tube and urging said cover member into said trough member, and inwardly extending projections on said trough member engaging said overlapping cable ends for holding the same against lengthwise movement relatively to said trough member.

2. A cable connection according to claim 1, in which said cover member also has inwardly extending projections engaging said overlapping cable ends.

3. A cable connection including a pair of gripping members between which the ends of two cables extend in overlapping relation to each other, one of said gripping members having sides which confine said cable parts against spreading laterally, a tube fitting snugly about said gripping members for holding the same in gripping relation to said cable parts, and yielding means for pressing said gripping parts toward each other, said yielding means also engaging said tube to prevent lengthwise movement of said tube relatively to said gripping members.

4. A cable connection including a pair of gripping members between which the ends of two cables extend, one of said gripping members having sides which confine said cable parts against spreading laterally, a tube fitting snugly about said gripping members for holding the same in gripping relation to said cable parts, a spring mounted on one of said gripping members and pressing against the interior of said tube for urging one of said members toward the other member, and a releasable connection between said spring and said tube for holding said tube against lengthwise movement relatively to said gripping members.

5. A cable connection including a pair of gripping members between which a part of a cable extends, one of said gripping members being of trough-shape in which a part of the cable may lie lengthwise thereof, and the other gripping member lying lengthwise of the open side of the trough-shaped member and being of a width to extend into said trough-shaped member to engage said part of the cable, a tube of rigid material into which said gripping members fit when gripping said cable, a leaf spring secured intermedaite of its ends to said second gripping member and having the ends thereof engaging the interior of said tube for urging said second gripping member into said trough-shaped gripping member, projections on said gripping members extending into position to engage the cable to hold the same against lengthwise movement relatively to said gripping members, and parts on said first mentioned gripping member extending into position to engage an end of said second gripping member to hold the same against movement lengthwise of said trough-shaped gripping member, and said spring cooperating with said tube for opposing movement of said tube lengthwise of said gripping members.

6. A cable connection including a pair of gripping members between which a part of a cable extends, one of said gripping members being of trough-shape in which a part of the cable may lie lengthwise thereof, and the other gripping member lying lengthwise of the open side of the trough-shaped member and being of a width to extend into said trough-shaped member to engage said part of the cable, a tube of rigid insulating material into which said gripping members fit when gripping said cable, a leaf spring secured intermediate of its ends to said second gripping member and having the ends thereof engaging the interior of said tube for urging said second gripping member into said trough-shaped gripping member, and parts on said gripping members for holding the same against movement lengthwise relatively to each other, said spring engaging said tube for opposing lengthwise movement of said tube relatively to said gripping members.

7. A cable connection including a pair of gripping members between which a part of a cable extends, one of said gripping members being of trough-shape in which a part of the cable may lie lengthwise thereof, and the other gripping member lying lengthwise of the open side of the trough-shaped member and being of a width to extend into said trough-shaped member to engage said part of the cable, a tube of rigid material into which said gripping members fit when gripping said cable, a leaf spring secured intermediate of its ends to said second gripping member and having the ends thereof engaging the interior of said tube for urging said second gripping member into said trough-shaped gripping member, projections on said gripping members extending into position to engage the cable to hold the same against lengthwise movement relatively to said gripping members, parts on said first mentioned gripping member extending into position to engage an end of said second gripping member to hold the same against movement lengthwise of said trough-shaped gripping member, and an outwardly extending shouldered portion on an end of said spring, said tube having a recess into which said shouldered portion of said spring extends for releasably locking said tube against endwise movement relatively to said gripping members.

8. A cable connection including a pair of gripping members between which a part of a cable extends, one of said gripping members being of trough-shape in which a part of the cable may lie lengthwise thereof, and the other gripping member lying lengthwise of the open side of the trough-shaped member and being of a width to extend into said trough-shaped member to engage said part of the cable, a tube of rigid material into which said gripping members fit when gripping said cable, a leaf spring secured intermediate of its ends to said second gripping member and having the ends thereof engaging the interior of said tube for urging said second gripping member into said trough-shaped gripping member, parts on said first mentioned gripping member extending into position to engage an end of said second gripping member to hold the same against movement relatively to said trough-shaped gripping member, an outwardly extending shouldered portion on an end of said spring, said tube having a recess before which said shouldered portion of said spring extends for releasably locking said tube and gripping members against endwise movement relatively to each other, and a flexible resilient sleeve of electrical insulating material covering the exterior of said tube.

9. A cable connection including a pair of gripping members between which a part of a cable extends, one of said gripping members having sides which confine said cable part against spreading laterally, a tube fitting snugly about said gripping members for holding the same in gripping relation to said cable part, a spring mounted on one of said gripping members and pressing against the interior of said tube for urging one of said members toward the other member, and interlocking parts on said spring and said tube for holding said tube against lengthwise movement relatively to said gripping members, said interlocking parts including a cam face on one of said parts arranged so that upon turning of said tube and spring relatively to each other, said spring is moved into releasing position to permit the tube to be moved lengthwise relatively to said gripping members.

10. A connection between a cable and an electrode holder, said electrode holder having a trough-shaped portion formed integral therewith and in which an end of a cable may extend, a gripping member movable into said trough-shaped portion to grip said cable and confine the same in said trough-shaped portion, means on said electrode holder for preventing lengthwise movement of said gripping member, an insulating handle for said electrode holder having a tubular portion extending about said trough-shaped part of said electrode holder, a spring interposed between said gripping member and said tubular portion and urging said gripping member toward the cable in said trough-shaped portion, and a releasable connection between said gripping member and said tubular part for holding said handle in operative relation to said electrode holder, said releasable connection including said spring.

References Cited in the file of this patent

UNITED STATES PATENTS

| 1,103,749 | Finkelstein | July 14, 1914 |
| 2,026,008 | Williams | Dec. 13, 1935 |
| 2,316,267 | McLarn | Apr. 13, 1943 |
| 2,547,080 | Hebeler | Apr. 3, 1951 |

FOREIGN PATENTS

| 816,464 | France | May 3, 1937 |